(12) United States Patent
Muhanna et al.

(10) Patent No.: US 9,161,203 B2
(45) Date of Patent: *Oct. 13, 2015

(54) NEGOTIATING DIFFERENT MOBILE IP DELIVERY STYLES

(75) Inventors: Ahmad Muhanna, Richardson, TX (US); Mohamed Khalil, Murphy, TX (US)

(73) Assignee: Apple Inc., Cupertino, CA (US)

(*) Notice: Subject to any disclaimer, the term of this patent is extended or adjusted under 35 U.S.C. 154(b) by 845 days.

This patent is subject to a terminal disclaimer.

(21) Appl. No.: 13/506,039

(22) Filed: Mar. 21, 2012

(65) Prior Publication Data

US 2012/0208533 A1    Aug. 16, 2012

Related U.S. Application Data

(63) Continuation of application No. 12/451,144, filed as application No. PCT/US2008/005714 on May 2, 2008, now Pat. No. 8,160,003.

(60) Provisional application No. 60/916,028, filed on May 4, 2007.

(51) Int. Cl.
*H04W 4/00* (2009.01)
*H04W 8/06* (2009.01)
(Continued)

(52) U.S. Cl.
CPC .............. *H04W 8/065* (2013.01); *H04W 48/14* (2013.01); *H04W 80/04* (2013.01)

(58) Field of Classification Search
CPC ...... H04W 8/065; H04W 48/14; H04W 80/04
See application file for complete search history.

(56) References Cited

U.S. PATENT DOCUMENTS

| 7,230,951 B2 | 6/2007 | Mizell et al. |
| 8,160,003 B2 * | 4/2012 | Muhanna et al. ............. 370/328 |

(Continued)

FOREIGN PATENT DOCUMENTS

| JP | 2002-217952 | 8/2002 |
| JP | 2006-050035 | 2/2006 |
| WO | 02/103540 A1 | 12/2002 |

OTHER PUBLICATIONS

Extended Search Report in related European Patent Application No. 08779607.4-1855 / 2145486, Apr. 5, 2013, pp. 1-6.

(Continued)

*Primary Examiner* — Steven H Nguyen
(74) *Attorney, Agent, or Firm* — Meyertons, Hood, Kivlin, Kowert & Goetzel, P.C.

(57) ABSTRACT

The present invention provides a system and method to selectively negotiate different delivery styles for different types of packets sent from the Mobile Node to the Foreign Agent, which will allow the Mobile Node to negotiate a delivery style that will permit the Foreign Agent to transmit certain selected outbound traffic directly without reverse tunneling that traffic back to the home network. Specifically, the present invention allows the Foreign Agent to distinguish between certain types of BC/MC packets that are designated to be processed and routed to their destinations by the Foreign Network directly, as opposed to reverse tunneling the outbound traffic from the Foreign Agent back to the Home Agent on the home network. By selecting processing by the Foreign Network, the efficiency of the system will improve because the transmission of outbound traffic and inbound responses will not need to be tunneled through the Home Network.

18 Claims, 1 Drawing Sheet

(51) Int. Cl.
*H04W 48/14* (2009.01)
*H04W 80/04* (2009.01)

(56) References Cited

U.S. PATENT DOCUMENTS

| | | |
|---|---|---|
| 2002/0150094 A1 | 10/2002 | Cheng et al. |
| 2003/0018715 A1* | 1/2003 | O'Neill .......................... 709/204 |
| 2003/0219000 A1* | 11/2003 | Magret .......................... 370/338 |
| 2004/0162892 A1* | 8/2004 | Hsu .............................. 709/221 |
| 2004/0221042 A1* | 11/2004 | Meier ........................... 709/227 |
| 2005/0108412 A1 | 5/2005 | Sjollema et al. |
| 2007/0070946 A1* | 3/2007 | Dorenbosch et al. ......... 370/331 |
| 2010/0278122 A1 | 11/2010 | Singh et al. |

OTHER PUBLICATIONS

Engelstad et al.; "Internet Connectivity for Multi-Homed Proactive Ad Hoc Networks;" IEEE International Conference on Communications (ICC), Jun. 20, 2004, XP010709874, ISBN: 978-0-7803-8533-7; pp. 4050-4056.

First Office Action in Chinese Patent Application No. 20088014733.3 issued Apr. 17, 2012 (and English translation thereof).

* cited by examiner

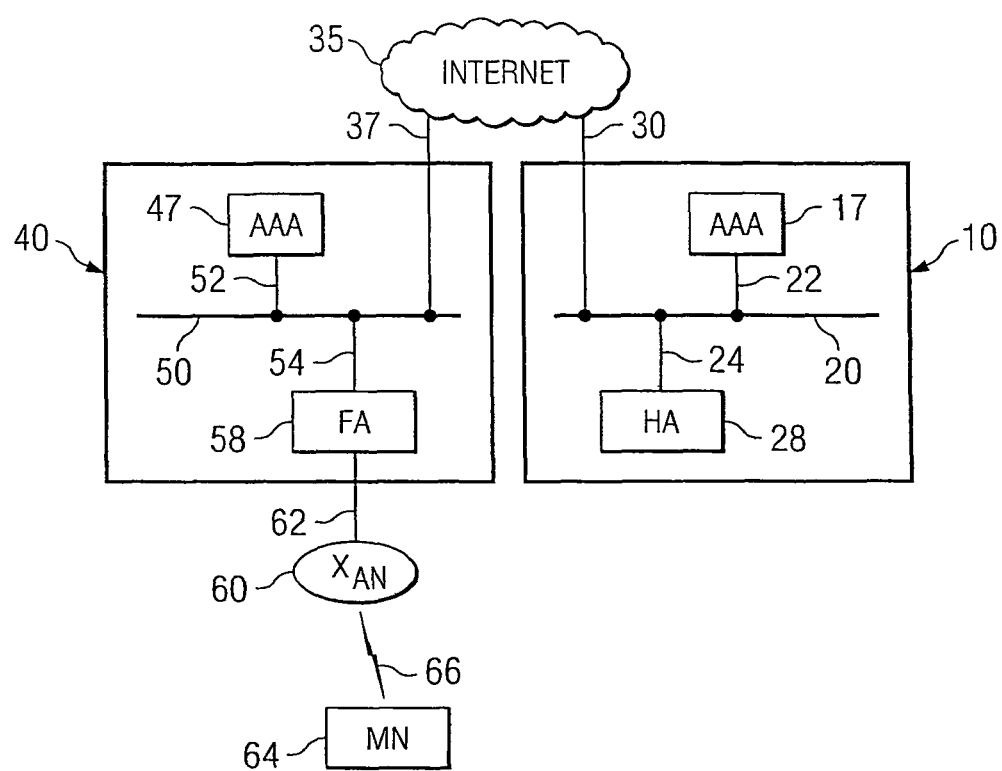

NEGOTIATING DIFFERENT MOBILE IP DELIVERY STYLES

RELATED APPLICATION DATA

This application is a continuation of 371 patent application Ser. No. 12/451,144 filed on Oct. 27, 2009, based on a PCT filing PCT/US08/05714 filed on May 2, 2008, which is related to Provisional Patent Application Ser. No. 60/916,028 filed on May 4, 2007, and priority is claimed to these earlier filings. The Provisional Patent Application and all related filings are incorporated by reference into this utility patent application.

TECHNICAL FIELD OF THE INVENTION

A system and method for any IP-based system, including an IP-based mobile communication system having a home network, foreign network and a mobile node.

BACKGROUND OF THE INVENTION

IP-based mobile system includes at least one Mobile Node in a wireless communication system. The term "Mobile Node" includes a mobile communication unit, and, in addition to the Mobile Node, the communication system has a home network and a foreign network. The Mobile Node may change its point of attachment to the Internet through these other networks, but the Mobile Node will always be associated with a single home network for IP addressing purposes. The home network has a Home Agent and the foreign network has a Foreign Agent—both of which control the routing of information packets into and out of their network.

The Mobile Node, Home Agent and Foreign Agent may be called other names depending on the nomenclature used on any particular network configuration or communication system. For instance, a "Mobile Node" encompasses PC's having cabled (e.g., telephone line ("twisted pair"), Ethernet cable, optical cable, and so on) connectivity to the wireless network, as well as wireless connectivity directly to the cellular network, as can be experienced by various makes and models of mobile terminals ("cell phones") having various features and functionality, such as Internet access, e-mail, messaging services, and the like. And, a home agent may be referred to as a Home Agent, Home Mobility Manager, Home Location Register, and a foreign agent may be referred to as a Foreign Agent, Serving Mobility Manager, Visited Location Register, and Visiting Serving Entity. The terms Mobile Node, Home Agent and Foreign Agent are not meant to be restrictively defined, but could include other mobile communication units or supervisory routing devices located on the home or foreign networks. Foreign networks can also be called serving networks.

Registering the Mobile Node

Foreign Agents and Home Agents periodically broadcast an agent advertisement to all nodes on the local network associated with that agent. An agent advertisement is a message from the agent on a network that may be issued under the Mobile IP protocol (RFC 2002) or any other type of communications protocol. This advertisement should include information that is required to uniquely identify a mobility agent (e.g. a Home Agent, a Foreign Agent, etc.) to a mobile node. Mobile Nodes examine the agent advertisement and determine whether they are connected to the home network or a foreign network.

If the Mobile Node is located on its home network, information packets will be routed to the Mobile Node according to the standard addressing and routing scheme. If the Mobile Node is visiting a foreign network, however, the Mobile Node obtains appropriate information from the agent advertisement, and transmits a registration request message to its Home Agent through the Foreign Agent. The registration request message will include a care-of address for the Mobile Node. A registration reply message may be sent to the Mobile Node by the Home Agent to confirm that the registration process has been successfully completed.

The Mobile Node keeps the Home Agent informed as to its current location by registering a "care-of address" with the Home Agent. The registered care-of address identifies the foreign network where the Mobile Node is located, and the Home Agent uses this registered care-of address to forward information packets to the foreign network for subsequent transfer onto the Mobile Node. If the Home Agent receives an information packet addressed to the Mobile Node while the Mobile Node is located on a foreign network, the Home Agent will transmit the information packet to the Mobile Node's current location on the foreign network using the applicable care-of address.

Foreign Agent Incoming and Outbound Traffic

The Foreign Agent participates in informing the Home Agent of the Mobile Node's current care-of address. The Foreign Agent also receives the "incoming" information packets addressed to the Mobile Node after the information packets have been forwarded by the Home Agent. Further, the Foreign Agent serves as a router for "outbound" information packets generated by the Mobile Node while connected to the foreign network depending on the delivery style chosen.

Under RFC 3024, after a Mobile Node arrives at a foreign network, it listens for agent advertisements and selects a Foreign Agent that supports its desired communications. The Mobile Node registers through the selected Foreign Agent. At this point, and depending on how the Mobile Node wishes to deliver packets to the Foreign Agent, the Mobile Node may also request either the Direct or the Encapsulating Delivery Style.

In the Direct Delivery Style, the Mobile Node designates the Foreign Agent as its default router and proceeds to send packets directly to the Foreign Agent, that is, without encapsulation. The Foreign Agent intercepts those packets, and reverse tunnels them to the Home Agent. In the Encapsulating Delivery Style, the Mobile Node encapsulates all its outgoing packets to the Foreign Agent. The Foreign Agent decapsulates and reverse tunnels those packets to the Home Agent, using the Foreign Agent's care-of address as the entry-point of this new tunnel.

Unicast, Broadcast and Multicast Messages

Unicast is the term used to describe communication where a piece of information is sent from one point to another point. In that situation, there is just one sender, and one receiver. A unicast transmission, in which a packet is sent from a single source to a specified destination, is the predominant form of transmission on the Internet.

Mobile Nodes sometimes transmit broadcast and multicast messages from their location on a foreign network. Broadcast is the term used to describe communication where a piece of information is sent from one point to all other points on another network, such as a foreign or home network. In this case there is just one sender, but the same information is sent to all connected receivers on that network.

Multicast is the term used to describe communication where a piece of information is sent from one or more points to a set of other points. In this case there may be one or more senders, and the information is distributed to a set of receivers. Multicasting is the networking technique of delivering the same packet simultaneously to a group of clients. Unlike broadcast transmission, however, multicast clients receive packets only if they have previously elect to do so by joining the specific multicast group address. Membership of a group is dynamic and controlled by the receivers. The Foreign Agent can recognize the multicast or broadcast address, and the Foreign Agent can distinguish those addresses from unicast addresses.

Encapsulation Delivery Style

When the Mobile Node have their unicast or broadcast/multicast ("BC/MC") packets reverse-tunneled by the Foreign Agent back to the Home Agent, the Mobile Node must use the encapsulating delivery style under RFC 3024. The encapsulation delivery style requires that the Mobile Node place an additional header on each outbound packet sent from the Mobile Node to the Foreign Agent. This encapsulation delivery style delivers the datagram only to the Foreign Agent, and the Foreign Agent decapsulates it and then processes it as any other packet from the Mobile Node, namely, by reverse tunneling it to the Home Agent.

Every time a Foreign Agent operating under RFC 3024 receives an encapsulated packet from a Mobile Node, the Foreign Agent will assume that reverse tunneling has been chosen and that the packet (regardless of whether unicast, multicast or broadcast) needs to be sent to the Home Agent without consideration of the type of datagram. With that assumption, all the encapsulated outbound traffic received at the Foreign Agent from the Mobile Node will be decapsulated and processed by the Foreign Agent to reverse tunnel it to the Home Agent.

This encapsulation of outbound BC/MC packets places an additional overhead demand on the Mobile Node that may not be necessary in all circumstances, and the encapsulation delivery style requires the Foreign Agent to perform the decapsulation/encapsulation actions in all situations where it receives an encapsulated packet, which may not be necessary all the time. It would be beneficial to avoid incurring these overhead losses for certain BC/MC packets, which would be supported by selectively negotiating the delivery style for certain BC/MC packets.

After the Foreign Agent transmits an encapsulated BC/MC packet back to the Home Agent with reverse tunneling, any responses to the BC/MC packet addressed to the Mobile Node must be transmitted through the Home Agent and tunneled through the home network before being transmitted to the Foreign Agent and onto the Mobile Node. This additional step of transmitting all responses through the Home Agent in all circumstances is required because of the reverse tunneling conducted by the Foreign Agent, but responding in that manner may constitute an unnecessary overhead loss that the system may want to avoid. It would be beneficial to have a choice of obtaining a more direct response to the Foreign Agent for certain BC/MC packets, which would be supported by selectively negotiating the delivery style for certain BC/MC packets.

SUMMARY OF THE INVENTION

The present invention provides a system and method to selectively negotiate different delivery styles for different types of packets sent from the Mobile Node to the Foreign Agent, which will allow the Mobile Node to negotiate a delivery style that will permit the Foreign Agent to transmit certain selected outbound traffic directly without reverse tunneling that traffic back to the home network. Specifically, the present invention allows the Foreign Agent to distinguish between certain types of BC/MC packets that are designated to be processed and routed to their destinations by the Foreign Network directly, as opposed to reverse tunneling the outbound traffic from the Foreign Agent back to the Home Agent on the home network.

By selecting processing by the Foreign Network, the efficiency of the system will improve because the transmission of outbound traffic and inbound responses will not need to be tunneled through the Home Network. For example, the outbound BC/MC traffic can be selected to be handled and routed by the Foreign Network to the multicast or broadcast destinations without reverse tunneling, and the inbound responses from such packet can be sent directly to the applicable Foreign Network for transmission to the Home Agent without the need to tunnel the response through the Home Agent and home network first.

BRIEF DESCRIPTION OF THE DRAWINGS

The objects and features of the invention will become more readily understood from the following detailed description and appended claims when read in conjunction with the accompanying drawings in which like numerals represent like elements and in which:

FIG. 1 is a mobile IP-based communication system as used in the present invention.

DETAILED DESCRIPTION OF THE PREFERRED EMBODIMENTS

In FIG. 1, the overall architecture of the IP-based mobile system is shown with a Mobile Node 64, a home network 10 and a foreign network 40. As shown in FIG. 1, the home network 10 and the foreign network 40 are coupled to the Internet represented by the cloud 35. The home network 10 has a central buss line 20 coupled to the Home Agent 28 via communication link 24. The buss line 20 is coupled to the AAA server 17 via communication link 22. The home network 10 is coupled to the Internet 35 via communication link 30. A communications link is any connection between two or more nodes on a network or users on networks or administrative domains.

The foreign network 40 has a central buss line 50 coupled to the foreign agent 58 via communication link 54. The buss line 50 is coupled to the AAA foreign network server 47 via communication link 52. The foreign network 40 is coupled to the Internet 35 via communication link 37. Mobile Node 64 is shown electronically coupled to the foreign network 40 via the wireless communication link 66 of transceiver 60. Transceiver 60 is coupled to the foreign network 40 via communication link 62. The Mobile Node 64 can communicate with any transceiver or Access Network coupled to the foreign network 40.

The terms Home Agent and Foreign Agent may be as defined in the Mobile IP Protocol (RFC 2002), but these agents are not restricted to a single protocol or system. In fact, the term Home Agent, as used in this application, can refer to a Home Mobility Manager, Home Location Register, Home Serving Entity, or any other agent at a home network 10 having the responsibility to manage mobility-related functionality for a Mobile Node 64. Likewise, the term Foreign Agent, as used in this application, can refer to a Serving Mobility Manager, Visited Location Register, Visiting Serving Entity, or any other agent on a foreign network 40 having the responsibility to manage mobility-related functionality for a Mobile Node 64.

In the mobile IP communications system shown in FIG. 1, the Mobile Node 64 is identified by a permanent IP address.

While the Mobile Node 64 is coupled to its home network 10, the Mobile Node 64 receives information packets like any other fixed node on the home network 10. When mobile, the Mobile Node 64 can also locate itself on foreign network 40. When located on foreign network 40, the home network 10 sends data communications to the Mobile Node 64 by "tunneling" the communications to the foreign network 40.

The Mobile Node 64 keeps the Home Agent 28 informed of its current location, or foreign network association, by registering a care-of address with the Home Agent 28. Essentially, the care-of address represents the foreign network 40 where the Mobile Node 64 is currently located. If the Home Agent 28 receives an information packet addressed to the Mobile Node 64 while the Mobile Node 64 is located on a foreign network 40, the Home Agent 28 will "tunnel" the information packet to foreign network 40 for subsequent transmission to Mobile Node 64.

The Foreign Agent 58 participates in informing the Home Agent 28 of the Mobile Node's 64 current care-of address. The Foreign Agent 58 also receives information packets for the Mobile Node 64 after the information packets have been forwarded to the Foreign Agent 58 by the Home Agent 28. Moreover, the Foreign Agent 58 serves as a default router for out-going information packets generated by the Mobile Node 64 while connected to the foreign network 40.

The Mobile Node 64 participates in informing the Home Agent 28 of its current care-of address. When the Mobile Node 64 is visiting a foreign network 40, the Mobile Node 64 obtains appropriate information regarding the address of the foreign network 40 and/or the Foreign Agent 58 from an agent advertisement. After obtaining this information, the Mobile Node 64 transmits the registration request to the Foreign Agent 58, which prepares the registration request message for forwarding to the Home Agent 28.

Mobile IP protocols require that the mobile node register the care-of address with the Home Agent 28 on the home network 10 after movement to a new foreign network 40. As part of the registration process, the Mobile Node 64 issues a registration request in response to power-up on the foreign network 40 or receipt of an agent advertisement. The registration request is sent to the Home Agent 28 on the home network 40, but only after the security association is established between the Foreign Agent 58 and the Home Agent 28.

A registration request message can be sent to the Home Agent 28 that includes a care-of address for the Mobile Node 64. A registration reply is issued by the Home Agent 28 to acknowledge receipt of the registration request, confirm receipt of the care-of address for the Mobile Node 64, and indicate completion of the registration process. The care-of address identifies the foreign network 40 where the Mobile Node 64 is located, and the Home Agent 28 uses this care-of address to tunnel information packets to the foreign network 40 for subsequent transfer to the Mobile Node 64.

All communications addressed to the Mobile Node 64 are routed according to normal IP protocols to the mobile node's home network 10. After registration is completed, the Home Agent 28 receives this communication and "tunnels" the message to the Mobile Node 64 on the foreign network 40. The Foreign Agent 58 accepts the re-directed communication and delivers the information packet to the Mobile Node 64 through the transceiver 60. In this manner, the information packets addressed to the Mobile Node 64 at its usual address on the home network 10 is re-directed or forwarded to the Mobile Node 64 on the foreign network 40.

The Foreign Agent 58 serves as a router for "outbound" information packets generated by the Mobile Node 64 while connected to the foreign network 40 depending on the delivery style chosen. Under RFC 3024, after a Mobile Node 64 arrives at a foreign network 40, it listens for agent advertisements and selects a Foreign Agent 58 that supports its desired communications. The Mobile Node 64 registers through the selected Foreign Agent 58. At this point, and depending on how the Mobile Node 64 wishes to deliver packets to the Foreign Agent 58, the Mobile Node 64 may also request either the Direct or the Encapsulating Delivery Style.

In the Direct Delivery Style, the Mobile Node 64 designates the Foreign Agent 58 as its default router and proceeds to send packets directly to the Foreign Agent 58, that is, without encapsulation. The Foreign Agent 58 intercepts those packets, and reverse tunnels them to the Home Agent 28. In the Encapsulating Delivery Style, the Mobile Node 64 encapsulates all its outgoing packets to the Foreign Agent 58. The Foreign Agent 58 decapsulates and reverse tunnels those packets to the Home Agent 28, using the Foreign Agent's care-of address as the entry-point of this new tunnel.

When the Mobile Node 64 have their unicast or broadcast/multicast ("BC/MC") packets reverse-tunneled by the Foreign Agent 58 back to the Home Agent 28, the Mobile Node 64 must use the encapsulating delivery style under RFC 3024. The encapsulation delivery style requires that the Mobile Node 64 place an additional header on each outbound packet sent from the Mobile Node 64 to the Foreign Agent 58. This encapsulation delivery style delivers the datagram only to the Foreign Agent 58, and the Foreign Agent 58 decapsulates it and then processes it as any other packet from the Mobile Node 64, namely, by reverse tunneling it to the Home Agent 28.

Every time a Foreign Agent 58 operating under RFC 3024 receives an encapsulated packet from a Mobile Node 64, the Foreign Agent 58 will assume that reverse tunneling has been chosen and that the packet (regardless of whether unicast, multicast or broadcast) needs to be sent to the Home Agent 28 without consideration of the type of datagram. With that assumption, all the encapsulated outbound traffic received at the Foreign Agent 58 from the Mobile Node 64 will be decapsulated and processed by the Foreign Agent 58 to reverse tunnel it to the Home Agent 28.

This encapsulation of outbound BC/MC packets places an additional overhead demand on the Mobile Node 64 that may not be necessary in all circumstances, and the encapsulation delivery style requires the Foreign Agent 58 to perform the decapsulation/encapsulation actions in all situations where it receives an encapsulated packet, which may not be necessary all the time. After the Foreign Agent 58 transmits an encapsulated BC/MC packet back to the Home Agent 28 with reverse tunneling, any responses to the BC/MC packet addressed to the Mobile Node 64 must be transmitted through the Home Agent 28 and tunneled through the home network before being transmitted to the Foreign Agent 58 and onto the Mobile Node 64. This additional step of transmitting all responses through the Home Agent 28 in all circumstances is required because of the reverse tunneling conducted by the Foreign Agent 58, but responding in that manner may constitute an unnecessary overhead loss that the system may want to avoid.

The present invention is distinguishable from RFC 3024 because, in RFC 3024, every time a Foreign Agent 58 operating under RFC 3024 receives an encapsulated packet from a Mobile Node 64, the Foreign Agent 58 will assume that reverse tunneling has been chosen and that the packet (regardless of whether unicast, multicast or broadcast) needs to be sent to the Home Agent 28 without consideration of the type of datagram. With that assumption, all the encapsulated outbound traffic received at the Foreign Agent 58 from the Mobile Node 64 will be decapsulated and processed by the Foreign Agent 58 to reverse tunnel it to the Home Agent 28. Further, under RF 3024, an unencapsulated packet will be encapsulated by the Foreign Agent 58 and reverse tunneled back to the Home Agent 28 by default without consideration of the type of datagram.

The present invention changes the assumptions that all received packets will be "reverse tunneled" in RFC 3024 such that only listed types of traffic in the delivery style extension will be delivered encapsulated to the Foreign Agent 58 by the Mobile Node 64 and reverse tunneled to the home network. This invention turns the prior assumptions from RFC 3024 regarding reverse tunneling up-side down. During registration, the Foreign Agent 58 and the Mobile Node 64 specify that reverse tunneling is permitted (RT=Yes) and that the Delivery Style will permit only listed types of traffic to be reverse tunneled back to the Home Agent 28 on the home network 10. The Delivery Style can be specified in the extension as "New" to designate the use of the present invention for an agreed upon set of types of traffic.

Under the present invention, if a broadcast/multicast ("BC/MC") packet containing a BC/MC destination in its source/destination designation is delivered to the Foreign Agent 58 by the Mobile Node 64 without being encapsulated, the Foreign Agent 58 will consider this transmission to be a packet that should be processed locally without being reverse tunneled back to the Home Agent 28 on the home network 10. The local processing of this unencapsulated MC/BC packet includes routing to the local addresses on the foreign network 40 or routing to the BC/MC destination addresses directly by the Foreign Agent 58.

The Foreign Agent must be able to recognize the BC/MC destination designation as part of a reserved known IP address that should be handled locally if found in an unencapsulated packet. The Foreign Agent 58 relies on the delivery style negotiated during the registration communications between the Foreign Agent 58 and the Mobile Node 64. As per this delivery style, the unencapsulated MC/BC packet needs to be processed locally, not reverse tunneled to the Home Agent 28. All encapsulated packets will be reverse tunneled back to the Home Agent. In this context, the present invention can eliminate the overhead losses associated with reverse tunneling all types packets by selectively reverse tunneling only certain specified packets.

If a BC/MC packet is delivered to the Foreign Agent 58 by the Mobile Node 64 that is encapsulated with an additional address header of (HoA/FA) for its source/destination designation, on top of the encapsulated datagram packet having an address header of (HoA/BC,MC) for the encapsulated source/destination designation, the Foreign Agent will recognize this packet as one of the listed types of traffic that needs to be reverse tunneled to the Home Agent 28. The Foreign Agent 58 will not process or consume the packet locally, but will decapsulate this packet, recapsulate it and reverse tunnel the packet to the Home Agent 28. The Foreign Agent will reverse tunnel the packet because it has negotiated this delivery style during the registration communications between the Foreign Agent 58 and the Mobile Node 64. As per this delivery style, the encapsulated MC/BC packet needs to be reverse tunneled to the Home Agent 28 because it is recognized by the Foreign Agent 58 as not being a packet that should be processed locally.

Further, if an unencapsulated packet with a unicast destination address in the source/destination designation is delivered to Foreign Agent 58 by the Mobile Node 64, the Foreign Agent will recognize this packet as traffic that needs to be reverse tunneled to the Home Agent 28. The Foreign Agent 58 will not process or consume the packet locally, but will treat this packet like a Direct Delivery packet by encapsulating it and reverse tunneling the packet to the Home Agent 28. The Foreign Agent 58 will reverse tunnel the packet because it has negotiated this delivery style during the registration communications between the Foreign Agent 58 and the Mobile Node 64. As per this delivery style, the unencapsulated unicast addressed packet needs to be reverse tunneled to the Home Agent 28 because it is recognized by the Foreign Agent 58 as not being a packet that should be processed locally.

As a first alternative embodiment to the preferred embodiment set forth above, the present invention will allow the Foreign Agent 58 to determine if certain specified messages should be reverse tunneled based on the particular source designations negotiated between the Mobile Node 64 and the Foreign Agent 58 or predetermined in some other manner. If the packet contains one of the predetermined destination designations, the Foreign Agent 58 will not process or consume the packet locally, but will treat this packet encapsulate it and reverse tunnel the packet to the Home Agent 28. In this context, the predetermined destination designation on the packet sent by the Mobile Node 64 to the Foreign Agent 58 could be the address designation for the Home Agent 28, which would not be topologically correct on the foreign network as received.

The Home Agent 28 address source designation for a BC/MC message or a unicast message would be sufficient for the Foreign Agent to recognize these packets as needing to be reverse tunneled back to the Home Agent 28. This delivery style is negotiated during the registration communications between the Foreign Agent 58 and the Mobile Node 64. As per this delivery style, all packets (except those with specified source addresses) will need to be processed locally and not reverse tunneled to the Home Agent 28. In this context, the present invention can eliminate the overhead losses associated with reverse tunneling all types packets by selectively reverse tunneling only certain specified packets.

As a second alternative embodiment to the preferred embodiment set forth above, the present invention will allow the Foreign Agent 58 to determine if certain specified messages should be processed locally based on the particular destination designations negotiated between the Mobile Node 64 and the Foreign Agent 58 or predetermined in some other manner. For instance, if a packet contains a unicast address which has a network prefix that is topologically correct for the serving or foreign networks, that packet will be processed locally without being reverse tunneled to the Home Agent. This alternative embodiment does not need to encapsulate packets, but could use the Foreign Agent 58 to conduct a Full Direct Delivery Style.

Unless the packet contains one of the predetermined destination designations (that require local processing), the Foreign Agent 58 will not process or consume the packet locally, but will treat this packet like a Direct Delivery packet by encapsulating it and reverse tunneling the packet to the Home Agent 28. The Foreign Agent 58 will reverse tunnel the packet because it has negotiated this delivery style during the registration communications between the Foreign Agent 58 and the Mobile Node 64. As per this delivery style, all packets (except those with specified destination addresses) will need to be reverse tunneled to the Home Agent 28 and not processed locally. The Foreign Agent 58 will likely need to be supplemented with sufficient intelligence to identify these particular addresses. In this context, the present invention can eliminate the overhead losses associated with reverse tunneling all types packets by selectively reverse tunneling only certain specified packets.

Having described the invention, we claim:

1. An apparatus, comprising:
   at least one network interface configured to couple to a local network, wherein the local network is coupled to one or more radio transceivers; and
   at least one packet processing element configured to:
   negotiate delivery parameters with a mobile device, wherein the delivery parameters include a set of destination designations, wherein the mobile device is operating outside a serving area of a home network of the mobile device;
   receive information packets from the mobile device via the one or more radio transceivers;
   in response to determining that a first packet from the mobile device does not include a destination designation in the set of designation destinations, tunnel the first packet to a home agent of the home network; and
   in response to determining that a second packet from the mobile device includes a destination designation in the set of designation destinations, forward the second packet on the local network.

2. The apparatus of claim 1, wherein the set of destination designations includes at least one of multicast destination address designations or broadcast destination address designations and does not include unicast destination address designations.

3. The apparatus of claim 1, wherein the packet processing element is configured to, in response to determining that a third packet is encapsulated, tunnel the third packet to the home agent.

4. The apparatus of claim 1, wherein the packet processing element is configured to, for a negotiated communication session, in response to determining that any information packet from the mobile device is encapsulated, tunnel the packet to the home agent.

5. The apparatus of claim 1, wherein the packet processing element is configured to forward the second packet based on determining that the second packet is not encapsulated.

6. The apparatus of claim 1, wherein the packet processing element is configured to negotiate the delivery parameters during a registration process for the mobile device.

7. The apparatus of claim 1, wherein the set of destination designations corresponds to reserved known addresses.

8. A mobile device, comprising:
   one or more processing elements; and
   one or more radios;
   wherein the mobile device is configured to:
   negotiate packet delivery parameters with a foreign agent on a foreign network,
   wherein the packet delivery parameters include a set of destination designations, and
   wherein the mobile device is associated with a home network and is operating outside of a serving area of the home network;
   transmit a first packet that includes a destination designation in the set of destination designations, thereby indicating to the foreign agent, based on the negotiation, to tunnel the first packet to a home agent of the home network; and
   transmit a second packet that includes a destination designation that is not in the set of destination designations, thereby indicating to the foreign agent, based on the negotiation, to forward the second packet via a local network of the foreign agent.

9. The mobile device of claim 8, wherein the set of destination designations includes at least one of multicast destination address designations or broadcast destination address designations and does not include unicast destination address designations.

10. The mobile device of claim 8, wherein the mobile device is further configured to indicate to the foreign agent to tunnel the first packet to the home agent by encapsulating the first packet.

11. The mobile device of claim 8, wherein the mobile device is further configured to indicate to the foreign agent to forward the second packet by not encapsulating the second packet.

12. The mobile device of claim 8, wherein the mobile device is configured to negotiate the delivery parameters during a registration process with the foreign agent.

13. The mobile device of claim 8, wherein the set of destination designations corresponds to reserved known addresses.

14. A non-transitory computer-readable medium having instructions stored thereon that are executable by a mobile device to perform operations comprising:
   negotiating packet delivery parameters with a foreign agent on a foreign network, wherein the packet delivery parameters include a set of destination designations, and wherein the mobile device is associated with a home network and is operating outside of a serving area of the home network;
   transmitting a first packet that includes a destination designation in the set of destination designations, thereby indicating to the foreign agent, based on the negotiation, to tunnel the first packet to a home agent of the home network; and
   transmitting a second packet that includes a destination designation that is not in the set of destination designations, thereby indicating to the foreign agent, based on the negotiation, to forward the second packet via a local network of the foreign agent.

15. The non-transitory computer-readable medium of claim 14, wherein the set of destination designations includes at least one of multicast destination address designations or broadcast destination address designations and does not include unicast destination address designations.

16. The non-transitory computer-readable medium of claim 14, further comprising encapsulating the first packet prior to transmitting the first packet, wherein the transmitted second packet is not encapsulated.

17. The non-transitory computer-readable medium of claim 14, wherein the negotiating the delivery parameters is performing during registration of the mobile device with the foreign agent.

18. The non-transitory computer-readable medium of claim 14, wherein the set of destination designations corresponds to reserved known addresses.

* * * * *